United States Patent
Russell et al.

(10) Patent No.: US 7,914,151 B2
(45) Date of Patent: Mar. 29, 2011

(54) MULTI-FUNCTION LIGHT MODULATORS FOR OPTICAL SYSTEMS

(75) Inventors: Andrew Ian Russell, Plano, TX (US); Steven M. Penn, Plano, TX (US); Jeffrey Scott Farris, Flower Mound, TX (US)

(73) Assignee: Texas Instruments Incorporated, Dallas, TX (US)

( * ) Notice: Subject to any disclaimer, the term of this patent is extended or adjusted under 35 U.S.C. 154(b) by 614 days.

(21) Appl. No.: 11/948,638

(22) Filed: Nov. 30, 2007

(65) Prior Publication Data
US 2009/0141200 A1 Jun. 4, 2009

(51) Int. Cl.
*G03B 21/28* (2006.01)
(52) U.S. Cl. ............. 353/31; 353/99; 348/771; 359/292
(58) Field of Classification Search .................... 353/31, 353/98, 99, 94; 359/290, 291, 292; 348/771
See application file for complete search history.

(56) References Cited

U.S. PATENT DOCUMENTS

| | | | |
|---|---|---|---|
| 6,322,219 B1 * | 11/2001 | Okamori et al. | 353/98 |
| 6,406,148 B1 | 6/2002 | Marshall et al. | |
| 6,411,751 B1 * | 6/2002 | Giles et al. | 385/16 |
| 6,457,833 B1 * | 10/2002 | Ishikawa et al. | 353/99 |
| 7,380,945 B2 * | 6/2008 | Chen | 353/20 |
| 7,431,460 B2 * | 10/2008 | Hall et al. | 353/30 |
| 7,518,781 B2 * | 4/2009 | Aubuchon | 359/290 |
| 7,665,850 B2 * | 2/2010 | Penn | 353/81 |
| 2002/0030893 A1 * | 3/2002 | Dewald et al. | 359/618 |

* cited by examiner

*Primary Examiner* — William C Dowling
(74) *Attorney, Agent, or Firm* — Charles A. Brill; Wade James Brady, III; Frederick J. Telecky, Jr.

(57) ABSTRACT

In one embodiment, a method includes transmitting one or more light beams by a first portion of a light modulator formed outwardly from a substrate. The one or more transmitted light beams are spatially integrated. A second portion of the light modulator is formed outwardly from the substrate. The second portion of the light modulator spatially integrates the transmitted light beams.

22 Claims, 3 Drawing Sheets

MULTI-FUNCTION LIGHT MODULATORS FOR OPTICAL SYSTEMS

TECHNICAL FIELD

The present disclosure relates in general to optical systems, and more particularly to multi-function light modulators for optical systems.

BACKGROUND

Spatial light modulators are devices that may be used in optical communication and/or video display systems. In some applications, spatial light modulators may generate an image by controlling a plurality of individual elements that manipulate light to form the pixels of the image. One example of spatial light modulator is a Digital Light Projection (DLP®) chip made by Texas Instruments Inc. A DLP® chip typically includes an array of micromirrors and is often referred to as a digital micromirror device ("DMD").

SUMMARY

In one embodiment, a method includes transmitting one or more light beams by a first portion of a light modulator formed outwardly from a substrate. The one or more transmitted light beams are spatially integrated. A second portion of the light modulator is formed outwardly from the substrate. The second portion of the light modulator spatially integrates the transmitted light beams.

Technical advantages of some embodiments of the present disclosure include faster switching in spatial light modulation. Technical advantages of other embodiments include avoidance of problems associated with electronically switching lasers, such as unpredictable transition waveforms. Technical advantages of other embodiments include enhanced wavelength and intensity control in spatial light modulation. Technical advantages of other embodiments include recycling at least some of the spatially-modulated light, which may increase optical efficiency.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1:
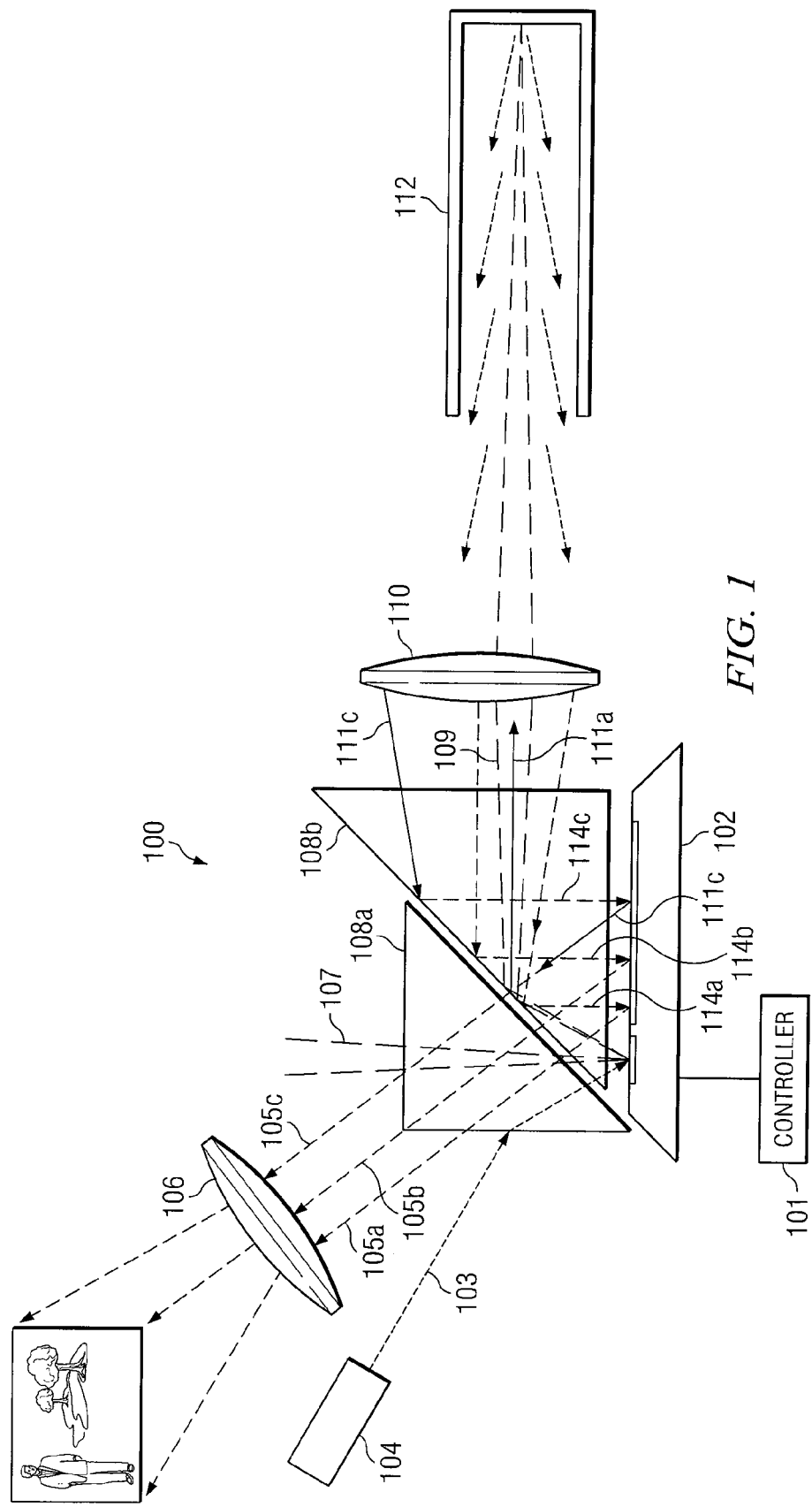
FIG. 1 illustrates a portion of an example of an optical system that generally includes one or more modulator(s) optically coupling respective light source(s) to a projection lens according to one embodiment.

FIG. 1 illustrates a portion of an example of an optical system 100 according to one embodiment. In this example, optically system 100 generally includes one or more controllers 101, one or more modulators 102, one or more light sources 104, a projection lens 106, and optical elements 108, 110, and 112, optically coupled as shown.

In general, modulator 102 controls the selective transmission of a source light beam 103 received from light source 104. In some embodiments, certain micromirrors of modulator 102 may transmit light beam 103 either to micromirrors of a first portion of modulator 102 or along optical path 107 to a light absorber (not shown). The first portion may receive light beam 103 and selectively transmit light beam 109 through optical elements 108, 110, and 112 along a first optical path 111a. A second portion of modulator 102 may then receive light beams 114a, 114b and 114c cycled back through optical elements 108, 110 and 112 and transmit spatially modulated light beams 105 to projection lens 106 along a second optical path 111b.

Modulator 102 generally refers to any device capable of modulating incident light beams (e.g., light beams 103 and 114). Modulator 102 may modulate an incident light beam by selective redirection, for example, redirection using reflective liquid crystal on silicon ("LCOS") technology. In various other embodiments, however, modulator 102 may selectively transmit, absorb, or diffract at least part of an incident light beam. For example, spatial light modulator 102 may comprise a liquid crystal panel or an interferometric modulator. The modulation of suitable modulators 102 may be either digital or analog. In the illustrated embodiment, modulator 102 includes multiple deformable micromirror arrays, as explained further below with reference to FIG. 2.

Light source 104 generally refers to any device(s) operable to generate source light beam(s) 103. For example, light source 104 may be any number of lasers, light emitting diodes (LEDs), arc lamps, any combination of the preceding, and/or any other suitable device operable to generate source light beam(s) 103. In the illustrated example, light source 104 includes at least three lasers, each operable to generate a respective light beam 103 having a particular wavelength range. For example, the three lasers may produce respective light beams 103 within the red, green, and blue visible spectrum, respectively. Some alternative embodiments may provide colored light beams 103 to modulator 102 using other suitable configurations. For example, an arc lamp may generate a white light beam that passes through a filter (not explicitly shown) to produce a light beam of sequentially varying color.

Lenses 106 and 110 and optical elements 108a, 108b, and 112 each generally refer to any suitable optical device(s) operable to transmit incident light beams in a manner that concentrates, diverges, refracts, diffracts, redirects, reshapes, integrates and/or reflects the beam. In the illustrated example, projection lens 106 receives light beams 105 from modulator 102 via optical elements 108a and 108b, and projects light beams 105 onto an image plane 114.

Optical elements 108a and 108b are prisms positioned relative to modulator 102 so as to manipulate at least some of the light transmitted to and/or from modulator 102. As shown in FIG. 1, optical elements 108a and 108b redirect source beam 103 to a portion of modulator 102, which may selectively transmit all, some, or none of the source light beam 103 through prism 108b toward lens 110 as light beam(s) 109. Lens 110 focuses light beam(s) 109 towards light integration element 112.

Integration element 112 integrates received light beams through multiple internal reflections. For example, integration element 112 may be a light-integration rod having a reflective inner sidewall. The integrated light beams are then redirected back through lens 110 (along path 111c) and prism 108b to a portion of modulator 102 as light beams 114, which may be spatially modulated by a portion of modulator 102 as light beams 105. Additional detail regarding example operations and configurations of modulator 102 are described further below with reference to FIG. 2.

Figure 2:
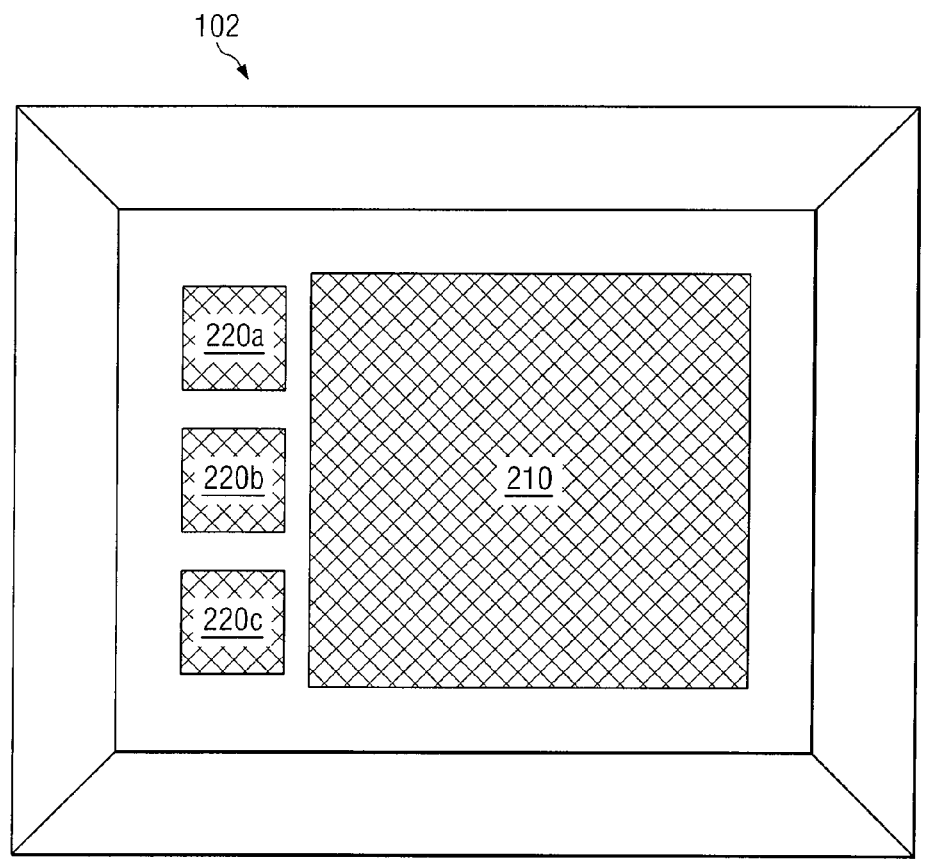
FIG. 2 illustrates an example of a top-view of an example modulator that may be used by the optical system of FIG. 1 according to one embodiment.

FIG. 2 illustrates an example of a top-view of the modulator 102 of FIG. 1 according to one embodiment. In this example, modulator 102 includes a main micromirror array 210 and plural micromirror mini-arrays 220a, 220b, and 220c. Each micromirror disposed within arrays 210 and 220 is operable to pivot on one or more axes in order to selectively communicate a respective portion of an incident light beam in any of multiple possible directions. A micromirror may be attached to one or more hinges and pivot in response to electrostatic forces. The electrostatic forces may be generated by electrodes in response to electrical signals received from controller 101.

In this example, main micromirror array 210 includes hundreds of thousands or millions of individually addressable micromirrors that may be used to spatially modulate light. In some embodiments, main array 210 produces field-sequential images by spatially modulating light beams 114 of sequentially varying color. In such embodiments, each micromirror of main array 210 may correspond to particular pixel of a display. To display a cluster of red pixels, for example, corresponding micromirrors of main array 210 may transition to respective "on states" when they are illuminated by red light beams 114 and to "off states" during illumination of other colors. A desired intensity of a red pixel may be modulated, for example, by varying the amount of time the corresponding micromirror is in an on state while illuminated by red light beams 114. To display a purple pixel, a corresponding micromirror(s) may transition to an on state when it is illuminated by a purple light beam 114, and/or may transition to an on state during separate blue and red light beam 114 illumination.

In this example, optical system 100 recycles off state light transmitted by main array 210, which may enhance optical efficiency. More specifically, a micromirror of main array 210 in an off state may transmit light beams back through optical element 108a, lens 110, and integration element 112. The same off state light beams may then be redirected back toward main array 210, where they may impinge on a different micromirror. This recycling process occurs repeatedly at essentially the speed of light, so the on state micromirrors of main array 210 receive substantially most or all light beams 114 transmitted to main array 210. In some embodiments, the intensity and particular wavelength spectrum of light beams 114 received by main array 210 at any given moment may be modulated by the operation of mini-arrays 220.

In this example, a mini-array 220 generally operates as a dynamic optical switch that selectively transmits light beams 103, which may be received from respective light sources 104. For example, in respective on states, mini-arrays 220a, 220b, and/or 220c may transmit all or a portion of respectively received light beams 103 through optical elements 108, 110, and 112 to main micromirror array 210. In respective off states, mini-arrays 220a, 220b, and/or 220c may transmit respectively received light beams 103 along optical path 107 toward a light absorber (not explicitly shown). One or more controllers 101 may control the status of the micromirrors of mini-arrays 220.

Mini-arrays 220 may control the intensity of light transmitted to main array 210. For example, mini-arrays 220a, 220b, and/or 220c may increase the intensity of light provided to main array 210 by increasing the number of individual micromirrors directing light toward optical elements 108, 110, and 112 in an "on state." Any mini-array 220a, 220b, or 220c may achieve a maximum intensity by configuring every micromirror to transmit light in an on state, and may achieve a minimum intensity by configuring only one or some other limited percentage of micromirrors in an on state. In some embodiments, lowering the intensity of light provided to modulator 102 may enhance the contrast and color quality of darker images. To completely switch off the light transmitted by mini-arrays 220a, 220b, and/or 220c, all the respective micromirrors may be configured in an off state.

In some embodiments, mini-arrays 220 may also control the wavelength spectrum of light beams 114 received by modulator 102. For example, light source(s) 104 may continually illuminate mini-arrays 220a, 220b, and 220c with red, green, and blue colored light beams 103, respectively. Main array 210 may be illuminated by a red-colored light beam 114, for example, by configuring all or a portion of mini-array 220a in an on state, while configuring mini-arrays 220b and 220c in off states. Similarly, main array 210 may be illuminated by a purple colored light beam 114, for example, by configuring all or respective portions of mini-arrays 220a and 220c in "on states," while configuring mini-array 220b in an off state. Thus, in some embodiments, one or more mini-array 220 may provide light beams 114 to main array 210 at any given moment, which may increase the possible color palette displayed by optical system 100.

In some embodiments, the micromirrors of mini-arrays 220 may each pivot along an axis that is different from a pivot axis of the main array 220 micromirrors. For example, with respect to the x-y coordinate system of FIG. 2, the micromirrors of mini-arrays 220 may pivot along a the x-axis and the micromirrors of main array 210 may pivot along the y-axis. In this manner, light beams transmitted by off-state micromirrors of mini-arrays 220 may be spatially separated from light beams 105 directed by main array 210 toward projection lens 106, which may minimize stray reflections directed towards lens 106.

In some embodiments, the micromirrors of mini-arrays 220 may disperse or otherwise reshape incident light beams 103. For example, light source 104 may include three separate lasers that provide respective coherent light beams 103 to mini-arrays 220a, 220b, and 220c. Surface treatments and/or surface topography of the micromirrors of mini-arrays 220 may disperse incident light beams 103. The dispersed light beams 103 may then be redirected and integrated through optical elements 108a, 110, and 112. In some display applications, dispersing light beams 103 in this or other manner may enhance the projected display by reducing undesired visual artifacts.

The illustrated embodiments of FIGS. 1 and 2 are for example purposes only. Modifications, additions, or omissions may be made to optical system 100 without departing from the scope of the present disclosure. In particular, optical system 100 may include alternative, fewer, or additional optical components, including for example, light source(s), beam splitter(s), lens, mirror(s), color filter(s), diffraction grating (s), prism(s), and/or any combination of the proceeding operable to perform various functions, such as, for example, splitting, diverging, refracting, diffracting, redirecting, reshaping, integrating and/or reflecting a beam of light. In addition, the components of optical system 100 may include alternative, fewer, or additional sub-components. For example, some of the described functions of mini-arrays 220a, 220b, and 220c may be alternatively performed by switchable gratings, acousto-optical modulators, or some other suitable sub-component. The components of optical system 100 may be integrated or separated. For example, in some alternative embodiments, some or all of the mini-arrays 210 and 220 may be integrated together in one continuous array of deformable micromirrors. In addition, in some alternative embodiments, light source 104 may be integrated within modulator 102, as illustrated further with reference to FIGS. 3 and 4.

Figure 3:
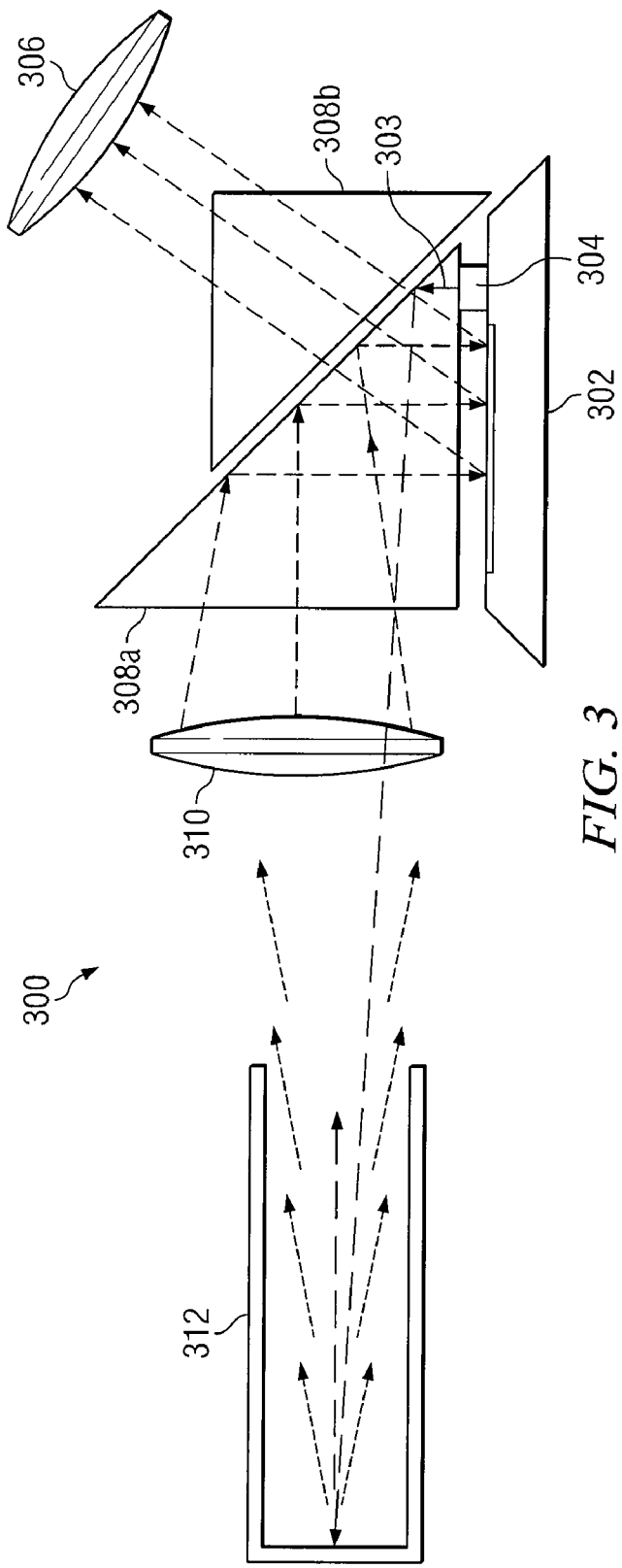
FIG. 3 illustrates a portion of an example of an optical system having a modulator with an integrated light source according to one embodiment.

FIG. 3 illustrates a portion of an optical system 300 having a modulator 302 with an integrated light source 304. Integrated light source 304 may be used in place of the light source 104 and mini-arrays 220 of FIGS. 1 and 2. In this example, integrated light source 304 includes multiple diode lasers having respective frequency converters and diffusers (not explicitly shown). Each diode laser and frequency converter pair is operable to generate respective source light beams 303 of various wavelength spectrums. Control signals applied to light source 304 may switch on and off the respective source light beams 303. In this manner, integrated light source 304 may illuminate a spatial modulating surface of modulator 302 by light beams 303 having sequentially-varying wavelengths. The spatially modulating surface of modulator 302 may transmit spatially modulated light beams in a manner substantially similar to main array 210 of FIG. 2. Optical elements 306, 308a, 308b, 310, and 312 generally perform substantially similar functions as respective optical elements 106, 108a, 108b, 110 and 112 of FIG. 1. In some embodiments, optical system 300 may satisfy requirements for a highly compact design.

Figure 4:
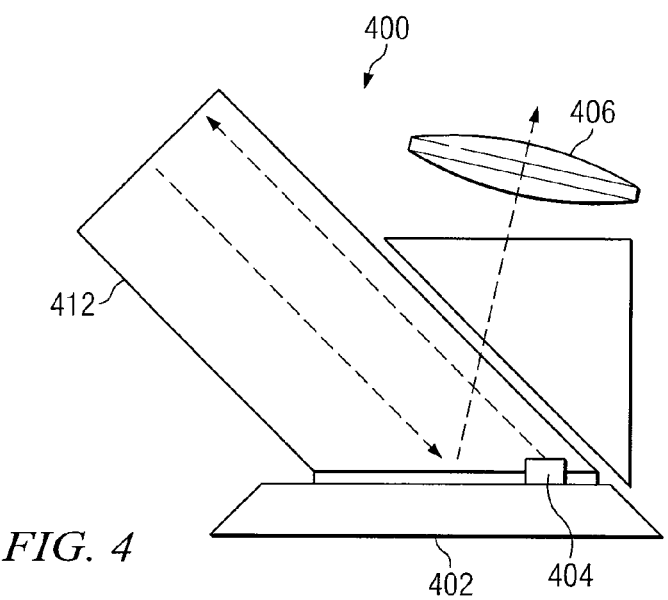
FIG. 4 illustrates a portion of an example of an optical system having a modulator with an integrated light source and an off-axis light-integration element according to one embodiment.

FIG. 4 illustrates a portion of an optical system 400 having a modulator 402 with an integrated light source 404 and an off-axis integration element 412 according to one embodiment. Light source 404 may be functionally and structurally similar to light source 304 of FIG. 3.

Off-axis integration element 412 is optically coupled directly to modulator 102, and may be mechanically coupled to modulator 102. Integration element 412 is generally operable to integrate the diffused light beams transmitted by light source 404 and transmit the integrated beams to a spatially modulating surface of modulator 402. In addition, integration element 412 may recycle "off state" light beams spatially modulated by the modulating surface of modulator 402. In some embodiments, optical system 400 may satisfy requirements for an extremely compact design and may require fewer optical components.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An optical system, comprising:
   a light-modulating device comprising:
      a plurality of optical switches; and
      an array of optical elements; and
   one or more light integration elements optically coupled to the plurality of optical switches and the array of optical elements,
   each optical switch of the plurality of optical switches being operable to selectively transmit a light beam of a plurality of light beams towards the one or more light integration elements to yield one or more transmitted light beams,
   the one or more light integration elements being operable to optically integrate the one or more transmitted light beams to yield one or more integrated light beams, and
   the array of optical elements being operable to spatially modulate the one or more integrated light beams to yield one or more modulated light beams.

2. The system of claim 1, the each optical switch of the plurality of optical switches further operable to selectively transmit the light beam towards a light absorber.

3. The system of claim 1, the array of optical elements further operable to direct the one or more modulated light beams towards a projection lens.

4. The system of claim 1, the array of optical elements further operable to direct the one or more modulated light beams towards the one or more light integration elements.

5. The system of claim 1, the each optical switch of the plurality of optical switches further operable to selectively transmit the light beam towards a light absorber; and
   the array of optical elements further operable to direct the one or more modulated light beams towards a projection lens spatially separated from the light absorber.

6. The system of claim 1, the each optical switch of the plurality of optical switches comprising a plurality of micromirrors; and
   further comprising a controller operable to control a state of each micromirror of the plurality of micromirrors.

7. The system of claim 1, the each optical switch of the plurality of optical switches comprising a plurality of micromirrors; and
   further comprising a controller operable to change the intensity of the one or more transmitted light beams by changing the number of micromirrors that are in an "on state."

8. The system of claim 1, the each optical switch of the plurality of optical switches comprising a plurality of micromirrors; and
   further comprising a controller operable to direct a set of micromirrors to reflect light of a particular wavelength to control the wavelength of the one or more transmitted light beams.

9. The system of claim 1, an optical switch of the plurality of optical switches comprising an array selected from the group consisting of:
   a reflective array of micromirrors;
   a transmissive array of liquid crystal cells;
   an interferometric array of deformable micromirrors;
   a switchable grating; and
   an acousto-optic modulator.

10. The system of claim 1, the array of optical elements comprising an array selected from the group consisting of:
   a reflective array of micromirrors;
   a transmissive array of liquid crystal cells;
   an interferometric array of deformable micromirrors;
   a switchable grating; and
   an acousto-optic modulator.

11. The system of claim 1, wherein the light integration element of the one or more light integration elements is mechanically coupled to the light-modulating device.

12. The system of claim 1, wherein the plurality of optical switches and the array of optical elements are disposed outwardly from a substrate.

13. A method, comprising:
   providing, by a first portion of a light modulator, one or more light beams to a second portion of a light modulator, the first and second portions of the light modulator formed outwardly from a substrate; and optically modulating, by the second portion of the light modulator, the provided one or more light beams.

14. The method of claim 13, the providing, by the first portion of the first portion of the light modulator, one or more light beams to the second portion of the light modulator further comprising:

providing the one or more light beams through a light integration rod to the second portion of the light modulator.

15. The method of claim 13, the providing, by the first portion of the first portion of the light modulator, one or more light beams to the second portion of the light modulator further comprising:

reflecting the one or more light beams by at least one micromirror of an array of micromirrors.

16. The method of claim 13, the providing, by the first portion of the first portion of the light modulator, one or more light beams to the second portion of the light modulator further comprising:

reflecting the one or more light beams by at least one micromirror of an array of micromirrors; and changing the intensity of the one or more provided light beams by changing a count of the at least one micromirror reflecting the one or more light beams.

17. The method of claim 13, the providing, by the first portion of the first portion of the light modulator, one or more light beams to the second portion of the light modulator further comprising:

controlling a frequency range of the one or more provided light beams by reflecting the one or more light beams by at least one respective micromirror of at least two arrays of micromirrors.

18. The method of claim 13, the optically modulating, by the second portion of the light modulator, the provided one or more light beams further comprising:

spatially modulating the provided one or more light beams by an array of micromirrors.

19. The method of claim 13, further comprising:

directing at least a portion of the optically modulated one or more light beams through a spatial integrator back to the second portion of the light modulator.

20. A light modulator, comprising:

one or more switches formed outwardly from a substrate and operable to direct a beam of light through integration optics to an array of optical elements formed outwardly from the substrate, the array of optical elements operable to spatially modulate the beam of light.

21. The light modulator of claim 20, the one or more switches comprising a plurality of micromirrors operable to modulate the intensity of the beam of light.

22. The light modulator of claim 20, the one or more switches comprising a plurality of micromirrors operable to modulate the frequency range of the beam of light.

* * * * *